Patented June 13, 1939

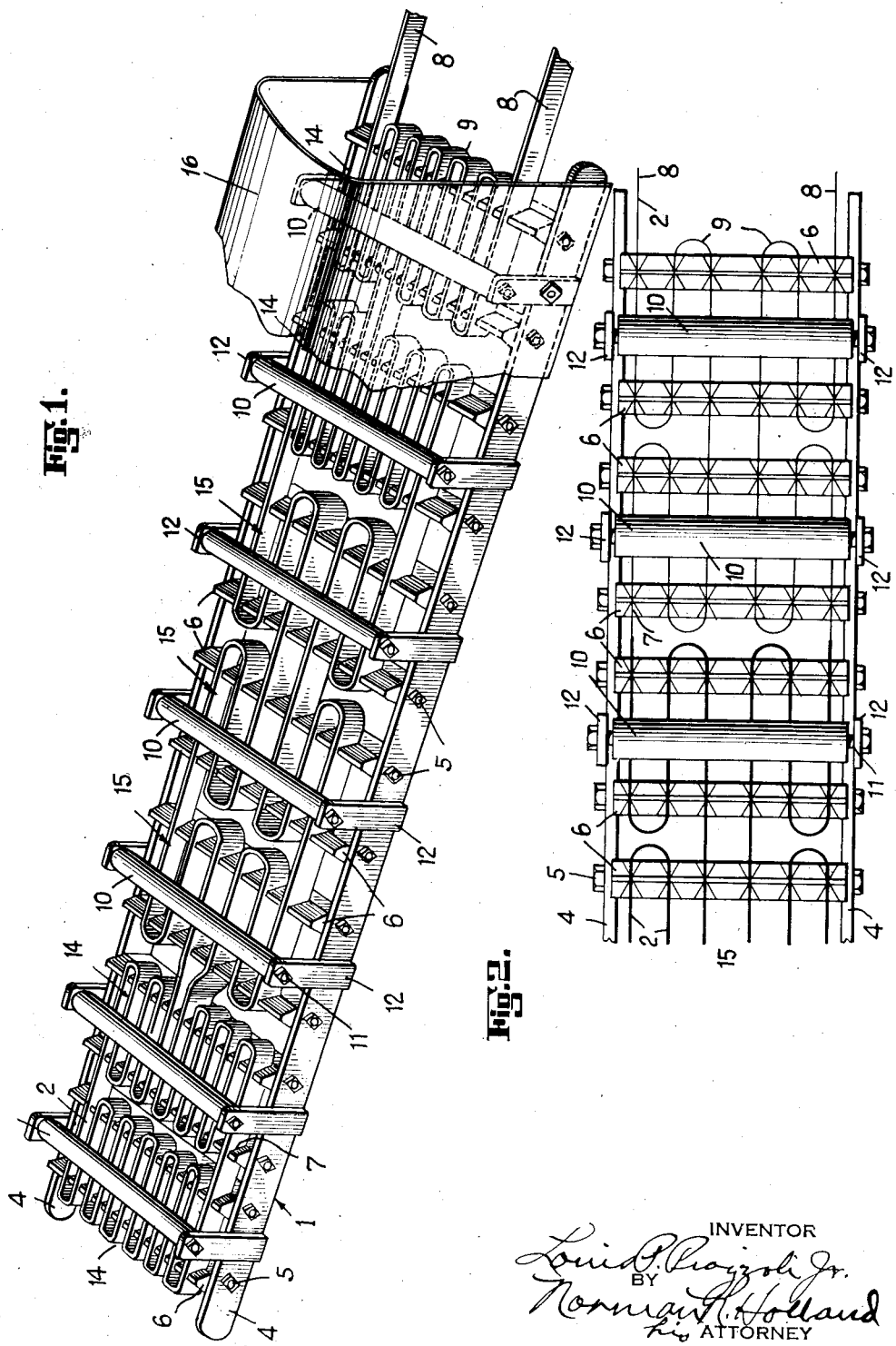

2,162,030

UNITED STATES PATENT OFFICE 2,162,030

HEATING DEVICE FOR GLASS LEHRS AND THE LIKE

Louis P. Piazzoli, Jr., Connellsville, Pa., assignor to Capstan Glass Company, Connellsville, Pa., a corporation of Delaware Original application April 21, 1930, Serial No. 445,886. Divided and this application July 3, 1936, Serial No. 88,748

6 Claims. (Cl. 201—74).

The present application is a division of the application of Louis P. Piazzoli, Jr., Serial No. 445,886, now Patent No. 2,056,207, dated October 6, 1936, for Annealing lehr, and the invention relates to the heating devices illustrated and described therein.

In the fabrication of articles from glass, internal strains are set up during the molding operations and it is necessary to raise the temperature of the molded glass articles to relieve these strains, thereby to prevent normal changes in temperature and normal shocks from breaking the articles. Under present practices, the glass articles are passed through an annealing lehr on a continuous conveyor and heating units are utilized for raising the temperature of the ware to the desired extent. Thereafter, the ware is permitted to cool gradually to prevent the establishment of strains as a result of the cooling operation. It is important that the heating units be adapted to create a substantially uniform temperature transversely of the lehr and a temperature gradient longitudinally of the lehr, increasing to a maximum and decreasing to normal temperatures. The problem of heating is complicated by reason of possible drafts in the lehr and by reason of the circulation of the heated air currents transversely of the lehr, as well as by the effect of external atmospheric temperatures which are minimized to a substantial extent but not completely eliminated by insulation. Heating units known heretofore for this purpose have been unsatisfactory.

The present invention aims to overcome the difficulties encountered heretofore by creating air currents effective primarily transversely of the lehr to create uniform heating conditions. These objects are achieved, in part, by creating heated air currents which rise along the sides of the lehr toward the center and mix with the air rising from the center to create a heating atmosphere of uniform temperature transversely of the lehr. These conditions are achieved by the construction of the heating units about to be described.

An object of the present invention is to provide a heating unit adapted to create heated air currents of different intensities adapted to mingle together and produce a uniform heating medium transversely of a lehr or furnace.

Another object of the invention is to provide a heating unit having greater heating capacity per unit of length at the ends thereof than at the middle to create stronger heating currents at the ends adapted to rise to the top of the lehr and be deflected downwardly into the weaker heating currents at the middle of the lehr to form a uniform heating medium transversely thereof.

Another object of the invention is to provide a heating unit with a deflector adapted to direct heating currents of greatest intensity upwardly at the ends of the heating units and at the sides of the lehr to cause the currents to rise up and be deflected into the middle of the lehr to create uniform temperatures transversely thereof.

Another object of the invention is to provide heating units or devices particularly adapted for heating glass annealing lehrs.

Another object of the invention is to provide an improved heating unit for lehrs and the like which is simple in construction, easy to manufacture, and readily removed and replaced.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a perspective view illustrating a preferred embodiment of the present invention with part of the shield broken away;

Fig. 2 is a fragmentary top plan view illustrating another embodiment of the invention;

Figure 3:
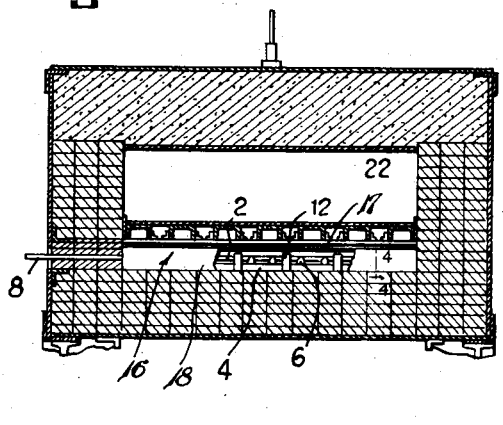
Fig. 3 is a side elevational view, partly in section, illustrating another embodiment of the invention.

Referring to the drawings, and more particularly to Fig. 1, there is shown a base, frame or supporting structure 1 having a resistance element 2 mounted thereon. The frame preferably is constructed of a pair of bars 4 held together by transversely extending bolts or rods 5 having insulators 6 mounted thereon for spacing the bars apart. The insulators have notches or grooves 7 at the top thereof which extend lengthwise with respect to the frame and are adapted to receive and support the resistance element 2. A shield 16 is mounted on the supporting structure and extends substantially the entire length thereof as described more particularly in connection with Figs. 3 and 4.

The resistance element illustrated herein preferably is in the form of an integral strip or ribbon, of any suitable electrical resistance material, for producing heat, such as nichrome or the like, having free ends 8 adapted to be connected to a suitable terminal for supplying electric current. The ribbon preferably is of uniform width and thickness throughout its length and is bent upon itself into a series of relatively short loops 9 extending lengthwise with respect to the frame. Preferably, two rods having insulators thereon are utilized for supporting each group of loops and seven groups or series of loops may be utilized. Each group of loops may be held downwardly on the insulator 6 by one or more tubular insulating members 10 mounted on a bolt 11 or the like extending through upright members 12 secured to the bars 4 of the frame. The tubular insulating members 10 engage the resistance elements lightly and are rotatable to permit thermal expansion and contraction of the resistance element without straining the supporting structure.

The loops may be of any desired shape but, preferably, are rounded at their ends to eliminate sharp corners. They are preferably relatively short to reduce the amount of thermal expansion of the resistance element per unit of length and further minimize strains on the supporting frame.

Figure 6:
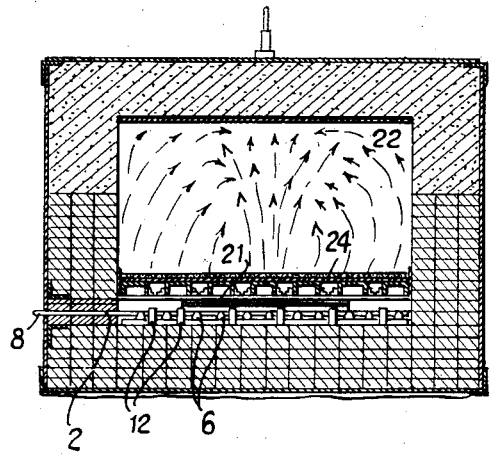
Fig. 6 is a sectional view illustrating a heating unit mounted in an annealing lehr, the arrows indicating the circulation of heat within the lehr.

The heating units described above are particularly adapted for heating electric annealing lehrs and are designed to extend cross-wise or transversely with respect to the lehr tunnel (Fig. 6). They are constructed to produce heating currents adapted to supply the same amount of heat to the ware being annealed throughout the width of the lehr tunnel, regardless of drafts or other adverse conditions within the lehr. This result may be attained by providing the groups of loops 14 adjacent the ends of the frame with a greater number of loops than the groups of loops 15 at the middle of the frame. For example, the groups 14 may have twice as many loops as the groups 15. Hence, the length of the resistance element in groups 14 is twice the length of element in groups 15 whereby twice as much heat is produced at the ends of the supporting structure as at the middle. In some cases, it may be sufficient to have less differences in the heating capacity of the groups.

Preferably, the loops of groups 14 and 15 are of uniform length to simplify the construction but, if desired, may be of different lengths. Also, certain loops may be spaced farther apart than others to decrease the intensity of the heat for a given area. This is particularly advantageous because each unit is designed to heat a longitudinal section of the lehr. By spreading the loops apart at portions where less heat is to be supplied, the heat nevertheless is distributed uniformly.

In Fig. 2, a slightly different construction is shown, wherein the same number of loops is provided in all the groups but the thickness of the ribbon is reduced at the ends of the unit to increase the resistance and produce a greater amount of heat. This resistance element may be formed of an integral strip having its thickness reduced at the ends of the unit or may be provided by attaching strips of varying thickness in any suitable manner. The ribbon preferably is uniform in width or height throughout its length, thus facilitating mounting the element on the insulating members 6. The loops preferably are of uniform length and width throughout to distribute the heat uniformly.

Figure 4:
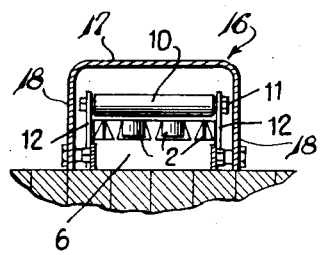
Fig. 4 is a sectional view taken along the line 4—4 of Fig. 3.

In Figs. 3 and 4, another construction is shown wherein a heating unit either like the unit shown in Fig. 1 or in Fig. 2 is utilized and a shield 16 is extended above the unit along the length thereof. The shield preferably is formed of a metal which is a good conductor of heat and has a top portion 17 ad depending side flange 18 which are adapted to be connected to the heating unit frame 1 in any suitable manner. The shield prevents direct radiation of heat from the heating strip and is adapted to radiate or distribute the heat throughout the width of the lehr. This provides a larger heat radiating surface, which permits more even radiation. Changes in temperature of the heating strip are, therefore, transmitted very slowly to the glassware. Since a greater amount of heat is supplied at the ends of the shield, the shield is adapted to radiate more heat at the ends thereof. Another advantage of this construction is that the shield covers the unit and prevents small fragments of glass from falling on the heating units. Molten glass is an electrical conductor. Hence, particles of glass accumulating on the heating units tend to cause short circuits, reducing the life of the units.

Figure 5:
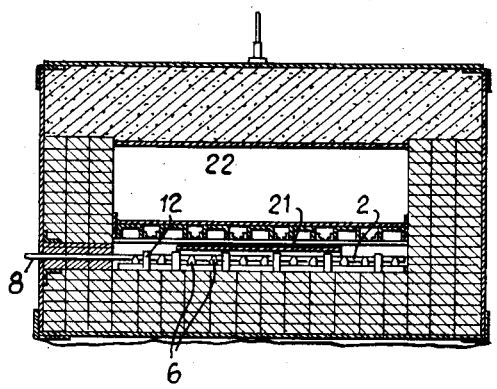
Fig. 5 is a side elevational view, partly in section, illustrating still another embodiment of the invention.

As illustrated in Fig. 5, the above heating effect may be attained by utilizing a heating unit having a uniform heating capacity throughout its length and extending a shield 21 over the central or middle portion of the unit. The shield prevents direct radiation of heat at the central portion and causes a substantial amount of heat to be conveyed by convection around the ends of the shield to the sides of the lehr, thereby increasing the heat delivered to the sides of the tunnel.

In Fig. 6, a heating unit is shown in operation in a lehr tunnel 22 or the like having a conveyor belt 24, or other suitable support, for the ware to be annealed. Any of the units illustrated in Figs. 1 to 5 may be utilized, since they are all designed to produce more heat at the sides of the lehr than at the middle. Hence, the operation of the heating unit about to be described is applicable to all the embodiments illustrated herein.

Preferably, the units, when used in connection with glass annealing lehrs or the like, are positioned at various points along the length of the lehr to produce a desired temperature gradient. When current passes through the resistance strip to cause radiation of heat, the heating currents, illustrated herein by the arrows, rise upwardly at the sides of the tunnel. This is due to the greatest heating intensity being at the ends of the unit, whereby stronger currents are created at the ends. As these heating currents reach the top of the tunnel, they are deflected and flow toward the middle of the tunnel where they mingle with the heat currents rising upwardly at the middle of the unit. Any drafts or other adverse cooling currents at the sides of the tunnel are heated to the desired temperature of the tunnel and the heating currents in turn are slightly cooled to approximately the same temperature as the currents rising upwards at the middle of the heating unit. Hence, when the side and middle currents meet, they merge at substantially the same temperature to provide a uniform heating atmosphere for annealing the glassware.

In this manner, the effective heat supplied to the glassware is uniform throughout the width of the tunnel and the ware is properly annealed, regardless of its position on the conveyor with respect to the sides of the lehr. By balancing the heat, adverse air currents within the lehr are minimized and desired temperature can be maintained more accurately. This permits better annealing and prevents breakage of the ware.

It will be seen that the present invention provides an improved heating unit for lehrs and the like which is simple in construction, easy to manufacture, and readily removed and replaced. The unit has a greater heat-intensity at the ends than at the middle to create heating currents of different intensities adapted to mingle together and produce a uniform heating medium transversely of the lehr. The heating units are rugged in construction and can readily withstand any rough usage to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A heating unit for an electric lehr, comprising a supporting structure adapted to be mounted in the lehr, a resistance element formed of a strip of material bent into a series of loops and mounted upon said supporting structure and positioned thereon to radiate heat in a vertical direction, the loops of said strip at the ends of the heating unit being adapted to produce more heat per unit of length of the heating unit than the loops at the middle thereof, and a shield mounted on the supporting structure and extending over said resistance element, said shield distributing more heat at its end portions than at the middle thereof.

2. A heating unit of the class described, comprising a supporting frame, a resistance element for producing heat mounted upon said supporting frame, said resistance strip having portions adapted to produce more heat at the ends of the frame per unit of length of the frame than at the middle of the frame, and a shield mounted on said supporting structure and extending over said resistance element, said shield distributing more heat at its end portions than at the equal middle portions thereof.

3. A heating unit of the class described, comprising a supporting structure, a resistance element mounted on said supporting structure having a series of connected groups of heating portions spaced lengthwise along said structure, the portions at the ends of said element being adapted to produce more heat than portions at the middle of said element, and a shield having a top portion extending over at least the middle of said resistance element and having flanges attached to said supporting structure.

4. A heating unit for an electric lehr comprising a supporting structure adapted to be mounted in the lehr, a resistance element formed of a strip of material bent into a series of loops and mounted upon said supporting structure, said resistance element having a greater number of loops per unit of length at the ends of said supporting structure than at the middle thereof to produce more heat at the ends of said structure than at the middle and a shield encasing said resistance element and mounted on said supporting structure.

5. A heating unit of the class described, comprising a resistance strip formed into a series of loops, means for holding said loops out of contact with each other, said resistance strip having at least twice the number of loops per unit of length at the ends of said means than at the center thereof to produce at least twice as much heat at the ends thereof and a shield formed of a heat conducting metal extending over said resistance strip.

6. In a heating unit of the class described, the combination of a supporting frame, an integral strip of resistance material mounted on said frame bent into groups of relatively short loops extending lengthwise of said frame, a plurality of the groups at each end of said frame having a greater heating capacity than an equal number of groups at the middle of the frame to produce more heat at the ends of said frame, and a shield having a top portion extending over said loops and having depending side portions attached to said supporting frame.

LOUIS P. PIAZZOLI, Jr.